United States Patent
Jeong

(10) Patent No.: US 10,290,872 B2
(45) Date of Patent: May 14, 2019

(54) CATHODE OF ALL-SOLID-STATE LITHIUM ION BATTERY AND ALL-SOLID-STATE LITHIUM ION BATTERY INCLUDING THE SAME

(71) Applicant: HYUNDAI MOTOR COMPANY, Seoul (KR)

(72) Inventor: Kyoung Jin Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 735 days.

(21) Appl. No.: 14/957,517

(22) Filed: Dec. 2, 2015

(65) Prior Publication Data

US 2016/0322639 A1    Nov. 3, 2016

(30) Foreign Application Priority Data

Apr. 30, 2015    (KR) .................. 10-2015-0061145

(51) Int. Cl.

| | | |
|---|---|---|
| H01M 4/62 | (2006.01) |
| H01M 4/131 | (2010.01) |
| H01M 4/136 | (2010.01) |
| H01M 4/1391 | (2010.01) |
| H01M 4/525 | (2010.01) |
| H01M 4/505 | (2010.01) |
| H01M 4/58 | (2010.01) |
| H01M 4/04 | (2006.01) |
| H01M 10/0562 | (2010.01) |
| H01M 10/0525 | (2010.01) |
| H01M 4/1397 | (2010.01) |
| H01M 4/38 | (2006.01) |
| H01M 10/052 | (2010.01) |

(52) U.S. Cl.
CPC ............. *H01M 4/622* (2013.01); *H01M 4/04* (2013.01); *H01M 4/136* (2013.01); *H01M 4/1397* (2013.01); *H01M 4/38* (2013.01); *H01M 10/0562* (2013.01); *H01M 4/625* (2013.01); *H01M 10/052* (2013.01); *H01M 2220/20* (2013.01); *H01M 2300/0068* (2013.01); *Y02E 60/122* (2013.01)

(58) Field of Classification Search
CPC .......... H01M 10/052; H01M 10/0562; H01M 2220/20; H01M 2300/0068; H01M 4/04; H01M 4/136; H01M 4/1397; H01M 4/38; H01M 4/622; H01M 4/625
See application file for complete search history.

(56) References Cited

U.S. PATENT DOCUMENTS

| 7,033,698 B2 | 4/2006 | Boczer et al. |
| 2013/0183577 A1* | 7/2013 | Voillequin ............ H01M 4/136 429/188 |

FOREIGN PATENT DOCUMENTS

| JP | 2010-186682 A | 8/2010 |
| JP | 2013-020818 A | 1/2013 |
| KR | 10-2006-0001748 A | 1/2006 |
| KR | 10-2013-0084638 A | 7/2013 |
| KR | 10-2013-0105474 A | 9/2013 |
| WO | 2013/146916 A1 | 10/2013 |

* cited by examiner

Primary Examiner — Carlos Barcena
(74) Attorney, Agent, or Firm — Morgan Lewis & Bockius LLP

(57) ABSTRACT

A cathode of an all-solid-state lithium ion battery is prepared by applying a slurry, in which an active material, a conductive material, a sulfide-based solid electrolyte, and a binder are mixed, to a substrate. The binder is a hydrogenated nitrile butadiene rubber (HNBR) having a residual double bond, an amount thereof is more than 0% and equal to or less than 5.5%.

11 Claims, 5 Drawing Sheets

CATHODE OF ALL-SOLID-STATE LITHIUM ION BATTERY AND ALL-SOLID-STATE LITHIUM ION BATTERY INCLUDING THE SAME

CROSS-REFERENCE TO RELATED APPLICATION

This application claims under 35 U.S.C. § 119(a) the benefit of priority to Korean Patent Application No. 10-2015-0061145 filed on Apr. 30, 2015, the entire content of which is incorporated herein by reference.

TECHNICAL FIELD

The present disclosure relates to a cathode which includes a hydrogenated nitrile butadiene rubber (HNBR) having a residual double bond, an amount thereof is more than 0% and equal to or less than 5.5% and a nitrile content of 20% to 30% as a binder, and an all-solid-state lithium ion battery including the same.

BACKGROUND

Recently, secondary batteries have been widely used in devises ranging from large devices such as automobiles and power storage systems to small devices such as mobile phones, camcorders, and lap-top computers.

Lithium secondary batteries have been used as secondary batteries because lithium secondary batteries have a larger capacity per unit area than that of nickel-manganese batteries or nickel-cadmium batteries.

However, conventional lithium secondary batteries can be easily overheated, have a low energy density of about 360 Wh/kg, and have a relatively low battery output, and thus, are not suitable as a next-generation battery for a vehicle.

Subsequently, an all-solid-state lithium ion battery having a higher output and a higher energy density has been developed.

The all-solid-state lithium ion battery includes: a cathode having an active material, a solid electrolyte, a conductive material, a binder, and the like; an anode; and a solid electrolyte interposed between the cathode and the anode.

The solid electrolyte is classified into an oxide-based electrolyte and a sulfide-based solid electrolyte. Since the sulfide-based solid electrolyte has a higher lithium ion conductivity than that of the oxide-based solid electrolyte and is stable in a wide voltage range, the sulfide-based solid electrolyte is more widely used.

The cathode may use sulfur as an active material, and may include a sulfide-based solid electrolyte. For example, in a related art, a lithium secondary battery uses a nitrile butadiene rubber (hereinafter, referred to as 'NBR') as a binder which binds an electrode material. Since the existing lithium secondary batteries do not use a sulfide-based compound, the NBR can be used.

However, since the all-solid-state lithium ion batteries include the sulfide-based solid electrolyte, the NBR causes a chemical reaction. Accordingly, when charge and discharge of the battery are repeated, the NBR may harden. The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to select and provide a binder which has low reactivity against a sulfide-based compound in an all-solid-state lithium ion battery.

In one aspect, the present disclosure provides a solvent which may completely dissolve a binder.

The object of the present disclosure is not limited to the aforementioned object, It will be more apparent from the following description and will be realized by means described in claims and by combinations thereof.

The present disclosure includes the following constitution in order to achieve the object.

A cathode of an all-solid-state lithium ion battery according to the present disclosure may be prepared by applying a slurry in which sulfur, a conductive material, a sulfide-based solid electrolyte, and a binder are mixed. The binder may be a hydrogenated nitrile butadiene rubber (HNBR) having a residual double bond, an amount thereof is more than 0% and equal to or less than 5.5%.

The slurry may further include a solvent which dissolves the binder. The solvent may include a mixture of cyclopentyl methyl ether (CPME) and a ketone-based solvent. In certain embodiments, the ketone-based solvent may be acetone or methyl ethyl ketone (MEK). In certain embodiments, the CPME and the ketone-based solvent may be mixed at a weight ratio of 9:1 to 8:2.

The HNBR may have the nitrile content of 20% to 30%. In certain embodiments, the amount of the residual double bond may be 5.5%, and the nitrile content may be 20%.

The amount of the residual double bond is 5.5%, and the nitrile content is 20%. In certain embodiments, the amount of the residual double bond amount may be 0.9% and the nitrile content may be 20%.

According to the present disclosure, the cathode of an all-solid-state lithium ion battery has a relatively low degree of binder curing during charge and discharge of the battery.

According to the present disclosure, the binder is uniformly dispersed in the cathode.

The all-solid-state lithium ion battery according to the present disclosure has improved discharge capacity and service life.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles; watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
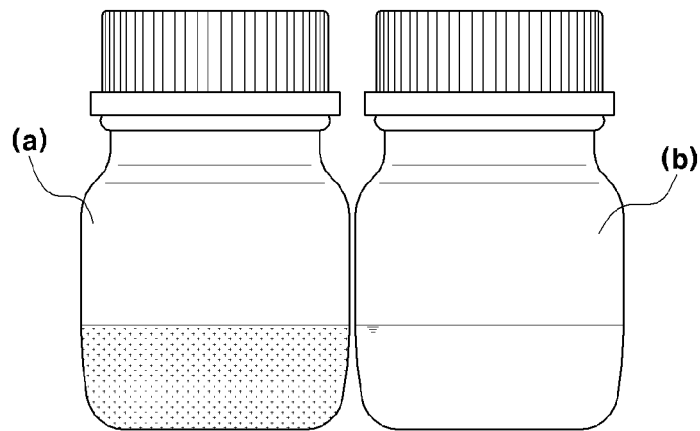
FIG. 1 is a hydrogenated nitrile butadiene rubber of Example 5 dissolved in cyclopentyl methyl ether.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, the present disclosure will be described in detail through the Examples. Examples of the present disclosure may be modified in various forms as long as the gist of the invention is not changed. However, the scope of the present disclosure is not limited to the following Examples.

If it is determined that the gist of the present disclosure is obscured, the description on publicly known configurations and functions will be omitted. The term "including" in the present specification means ability to further include other constituent elements unless otherwise specifically described.

A cathode of an all-solid-state lithium ion battery according to the present disclosure may be prepared by dissolving a binder in a solvent, mixing an active material, a conductive material, and a solid electrolyte to produce a slurry, and applying the slurry to a substrate. The slurry may further include a dispersing agent.

As the active material, a sulfide-based active material such as sulfur or an oxide-based active material such as lithium nickel cobalt manganese oxide (NCM), lithium nickel cobalt aluminum oxide (NCA), and lithium cobalt oxide (LCO) may be used. If a nitrile butadiene rubber (NBR) is used as a binder when a sulfide-based active material is used, the sulfide-based active material may react with NBR.

The conductive material imparts conductivity to the cathode. The all-solid-state lithium ion battery is discharged when electrons are brought into contact with an active material, thereby causing a reduction reaction. That is, the electrons need to smoothly move within the cathode. Therefore, a conductive material having a relatively high conductivity is required for the electrons to move. As the conductive material, carbon black, Ketjenblack, graphite powder, and the like may be used.

The solid electrolyte allows the movement of lithium ions within the cathode. As the solid electrolyte, an amorphous oxide-based solid electrolyte may be used. In a certain embodiments, a sulfide-based solid electrolyte is used for a high discharge capacity. As the sulfide-based solid electrolyte, $Li_2S$, $Li_2S-P_2S_5$, $Li_2S-SiS_2$, $Li_2S-GeS_2$, $Li_2S-B_2S_5$, $Li_2S-Al_2S_5$, and the like may be used.

Hereinafter, the term "sulfide-based compound" means a sulfide-based solid electrolyte in some embodiment, or a sulfide-based active material such as a sulfide-based solid electrolyte and sulfur in other embodiments.

The binder binds cathode materials, such as an active material, a conductive material, and a solid electrolyte, together.

The active material is reduced when the battery is discharged, and is oxidized when the battery is charged. That is, the volume of the active material is changed when the battery is charged and discharged. Therefore, an interface resistance is generated between the cathode materials, and the binder may alleviate the interface resistance.

The NBR used as a binder in the existing lithium secondary battery has the following Formula 1.

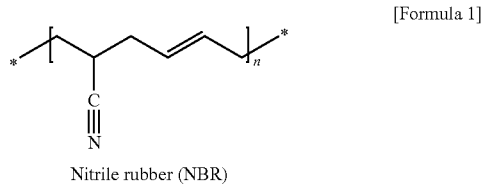

[Formula 1]

Nitrile rubber (NBR)

The NBR has a double bond in a carbon chain. Therefore, the NBR has high reactivity against an active material of the all-solid-state lithium ion battery and the sulfide-based compound such as a sulfide-based solid electrolyte. The NBR is hardened when being reacted with the sulfide-based compound, and thus, fails to alleviate the interface resistance between the cathode materials. Further, since the volume of the sulfide-based compound is expanded, cracks are generated on the battery.

On the other hand, the cathode of the all-solid-state lithium ion battery according to the present disclosure uses a hydrogenated nitrile butadiene rubber (hereinafter, referred to as 'HNBR') as a binder.

The HNBR has the following formula shown in Formula 2.

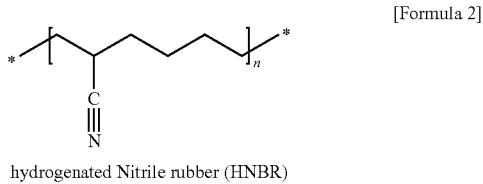

[Formula 2]

hydrogenated Nitrile rubber (HNBR)

The HNBR is obtained by adding hydrogen to the NBR to remove the double bond from the carbon chain. Accordingly, the HNBR is chemically stable, and has a relatively low reactivity against the sulfide-based compound.

The following two factors are important in order to use the HNBR for the cathode of the all-solid-state lithium ion battery according to the present disclosure.

1) Amount of Residual Double Bond
2) Nitrile Content

The amount of residual double bond means the amount of double bonds remaining in the carbon chain of the HNBR.

Hereinafter, the amount of residual double bond is expressed as "%". The term "%" in the amount of residual double bond means a ratio of repeating units in which the double bond has not been removed/divided by the repeating units in which the double bond has been removed in repeating units of HNBR.

Hereinafter, the nitrile content will be expressed as "%". The NBR (or HNBR) is composed of a butadiene repeating unit and an acrylonitrile repeating unit. The term "%" in the nitrile content refers to the molar amount of acrylonitrile in the NBR (or HNBR).

When the amount of residual double bond needs to be more than 0% and equal to or less than 5.5%, the HNBR has a sufficiently low reactivity against a sulfide-based compound, and thus, it is possible to prevent the HNBR from being hardened. In certain embodiments, the residual amount of double bonds is more than 0% and equal to or less than 0.9%.

When the nitrile content needs to be between 20% to 30%, the HNBR may be completely dissolved in a solvent according to the present disclosure because a dielectric constant of the solvent changes according to the nitrile content. Thus, solubility of the HNBR varies. If the HNBR is not dissolved in the solvent, the HNBR is not uniformly dispersed when the cathode is prepared.

Hereinafter, the present disclosure will be described in more detail through the Examples. However, these Examples are provided for exemplifying the present disclosure, and the scope of the present disclosure is not limited thereto.

EXAMPLES

The following examples illustrate the present disclosure and are not intended to limit the same.

Examples 1 to 6 and Comparative Example

An HNBR having a residual double bond and a nitrile content as in the following [Table 1] was prepared. An NBR was used for Comparative Example.

TABLE 1

| Classification | Example 1 | Example 2 | Example 3 | Example 4 | Example 5 | Example 6 | Comparative Example |
|---|---|---|---|---|---|---|---|
| Amount of residual double bond (%) | 0.9 or less | 0.9 or less | 0.9 or less | 5.5 | 5.5 | 0.9 or less | 78 |
| Nitrile content (%) | 34 | 39 | 43 | 34 | 20 | 20 | 34.7 |

Evaluation of Solubility

A cathode of an all-solid-state lithium ion battery according to the present disclosure includes a solvent which dissolves a binder.

The solvent may be appropriately selected according to a preparation environment and the like. However, since a strong polar solvent may dissolve a sulfide-based solid electrolyte, a non-polar or weak polar solvent may be used. So, cyclopentyl methyl ether (hereinafter, referred to as 'CPME'), xylene(o-xylene, m-xylene, p-xylene) or heptane can be used as the solvent in the present disclosure, Each binder in Examples 1 to 6 and Comparative Example were dissolved in an amount of 1.5 wt % in cyclopentyl methyl ether (hereinafter, referred to as 'CPME'). The results are described in the following [Table 2].

TABLE 2

| Classification | Example 1 | Example 2 | Example 3 | Example 4 | Example 5 | Example 6 | Comparative Example |
|---|---|---|---|---|---|---|---|
| Evaluation result | Insoluble | Insoluble | Insoluble | Insoluble | Opaque/No precipitate | Opaque/No precipitate | Insoluble |

The binders used in Examples 5 and 6 were partially dissolved, but the binders used in the other Examples and Comparative Example were not dissolved at all.

FIG. 1 illustrates the result of Example 5. Referring to the bottle (a), it can be seen that the HNBR of Example 5 was not completely dissolved, and thus, was opaque. The bottle (b) was obtained by centrifuging the bottle (a). As a result of separating the precipitate from the bottle (b) and performing a measurement, it was confirmed that 6 wt % of the HNBR was not dissolved.

In order to completely dissolve the HNBR, a mixed solvent obtained by mixing a ketone-based solvent is used as an auxiliary solvent with the CPME.

As the ketone-based solvent, acetone or methyl ethyl ketone (MEK) may be used.

The ketone-based solvent has strong polarity, and thus, the solvent may dissolve a sulfide-based compound. Accordingly, the mixed solvent is used by mixing the CPME and the ketone-based solvent at a weight ratio of 9:1 to 8:2.

Figure 2:
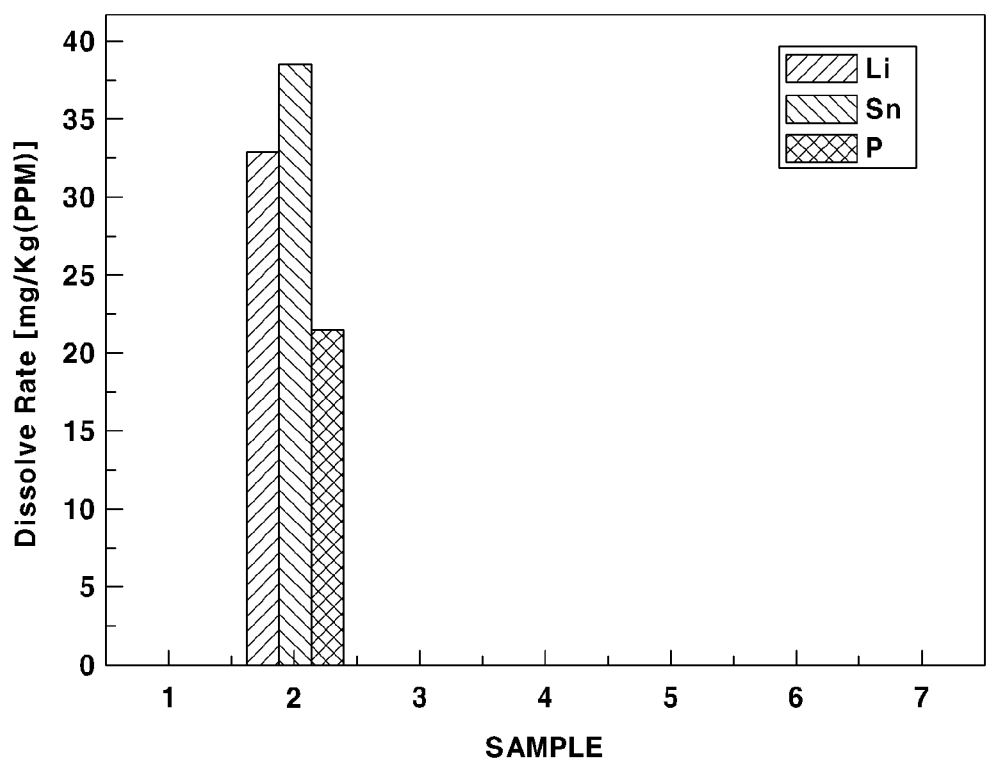
FIG. 2 is a graph illustrating an inductively coupled plasma mass spectrometer (ICP-MS) of a solvent composition.

FIG. 2 is a graph illustrating an inductively coupled plasma mass spectrometer (ICP-MS) when a solvent having the following composition of [Table 3] was used.

TABLE 3

| | Sample | | | | | | |
|---|---|---|---|---|---|---|---|
| | 1 | 2 | 3 | 4 | 5 | 6 | 7 |
| CPME [wt %] | 100 | 0 | 99 | 97 | 95 | 93 | 90 |
| Acetone [wt %] | 0 | 100 | 1 | 3 | 5 | 7 | 10 |

Referring to FIG. 2, it can be seen that when 100 wt % of acetone was used, the sulfide-based compound was dissolved, and thus, ions, such as Li, Sn, and P, were detected.

Accordingly, the sulfide-based compound may not be dissolved when the weight ratio of the CPME and the ketone-based solvent of the mixed solvent is between 9:1 to 8:2.

The HNBR of Examples 5 and 6 were dissolved in the mixed solvent of the CPME and acetone. The results are described in the following [Table 4]. The mixed solvent was produced by mixing the CPME and acetone at a weight ratio of 8:2.

TABLE 4

| | Nitrile content [%] | Amount of residual double bond [%] | Sample No. | Evaluation result |
|---|---|---|---|---|
| Example 5 | 20 | 5.5 | 4 | Completely dissolved |
| Example 6 | 20 | 0.9 | 5 | Completely dissolved |

The HNBR of Examples 5 and 6 were completely dissolved in the mixed solvent.

The HNBR may be completely dissolved in the mixed solvent when the nitrile content is 20% to 30%.

Evaluation of Reactivity Against Sulfide-Based Compound

Each reactivity of Example 5 and Comparative Example against the sulfide-based compound was evaluated.

The degree of binder curing was measured by using a blender to mix 30 wt % of sulfur and 1.5 wt % of a binder (HNBR, NBR).

Figure 3:
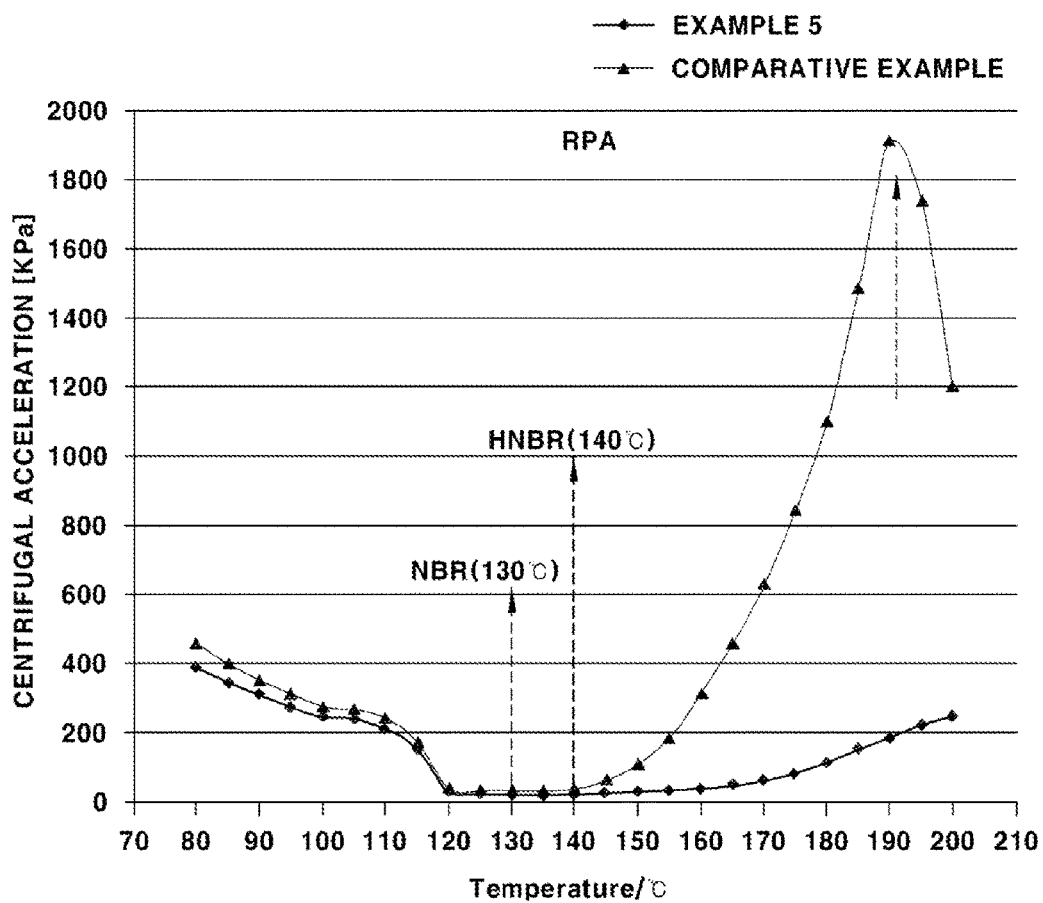
FIG. 3 is a graph showing the degree of binder curing at each temperature when hydrogenated nitrile butadiene rubbers of Example 5 and Comparative Example are reacted with sulfur.

FIG. 3 is a graph showing the degree of binder curing of Example 5 and Comparative Example at each temperature. The y-axis of FIG. 3 is a centrifugal acceleration of a blender. The centrifugal acceleration means a force required for the blender to rotate. As the binder is cured and hardened, the force required for the blender to rotate increases, thereby increasing the centrifugal acceleration.

Referring to FIG. 3, the blender of Example 5 and Comparative Example has a centrifugal acceleration of 0 Kpa or more at room temperature (25° C.) to 120° C. This means that solid sulfur and the binder are mixed.

The blender of Example 5 and Comparative Example has the centrifugal acceleration of about 0 Kpa at 120° C. It can be seen that the binder and sulfur were liquefied.

In Comparative Example, the centrifugal acceleration began to increase at 130° C. That is, the NBR reacted with sulfur and began to be cured. The blender of Comparative Example has a centrifugal acceleration of about 1,900 Kpa at 190° C. In this case, it can be seen that the degree of NBR curing increased further, and thus, the NBR is decomposed.

The term "decomposed" means that the NBR does not have binder properties, thus cannot be used as a binder.

In Example 5, the centrifugal acceleration began to increase at 140° C. Further, the sulfur is solid at 200° C. or more (an interval of room temperature to 120° C.), the blender of Example 5 has a lower centrifugal acceleration than before. Accordingly, it can be seen that the HNBR was not excessively cured because the HNBR has a small amount of residual double bond of 5.5%, such that reactivity against sulfur is low.

The HNBR of Example 5 begins to be cured at a temperature which is about 10° C. higher than the temperature of Comparative Example, and the centrifugal acceleration in the entire temperature range is low. That is, it can be seen that the HNBR having the amount of residual double bond of 5.5% or less has a lower degree of curing than that of the NBR. In addition, the HNBR is not decomposed even at the temperature of 190° C. or more. Accordingly, the HNBR has superior temperature stability than the NBR.

Figure 4:
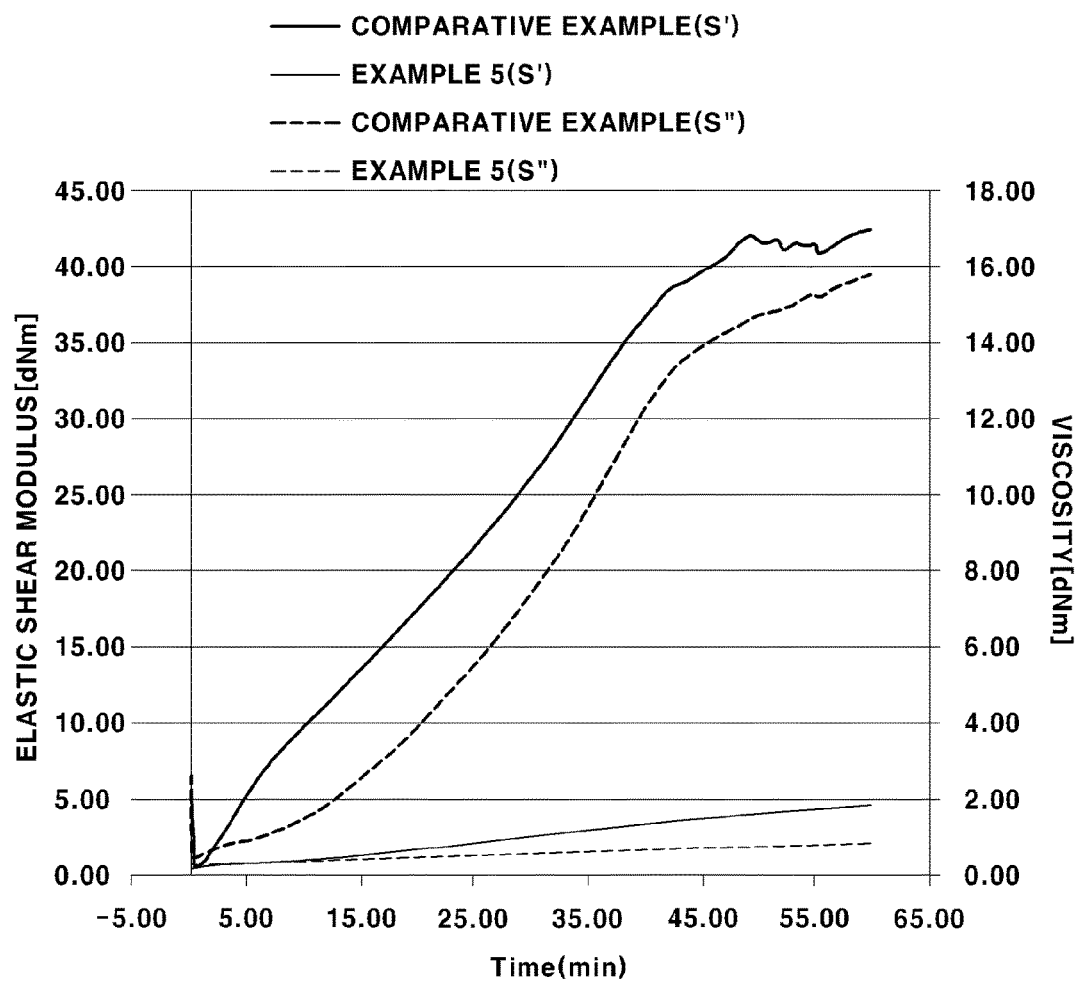
FIG. 4 is a graph showing the degree of binder curing when hydrogenated nitrile butadiene rubbers of Example 5 and Comparative Example react with sulfur.

FIG. 4 is a graph showing the degree of binder curing of Example 5 and Comparative Example. Experiments were conducted by fixing a temperature at 160° C. The y-axis on the left side of FIG. 4 indicates an elastic shear modulus, and the y-axis on the right side indicates viscosity. The elastic shear modulus and viscosity also mean a force required for the blender to rotate.

Referring to FIG. 4, the binder of Comparative Example became stiffer and harder in 45 minutes. On the contrary, in the case of Example 5, it can be seen that the elastic shear modulus and viscosity scarcely increased. That is, the binder of the Comparative Example reacted with sulfur and cured, whereas in Example 5, a reaction scarcely occurred.

That is, it can be seen that the HNBR having the amount of residual double bond of 5.5% or less reacted with sulfur less actively than the NBR, and thus, has a lower degree of during than that of the NBR.

When the HNBR has an amount of residual double bond of more than 0% and 5.5% or less, the HNBR has low reactivity against the sulfide-based compound so that the HNBR is not easily cured during charge and discharge of the all-solid-state lithium ion battery. Accordingly, since an interface resistance between cathode materials such as an active material may be sufficiently alleviated, a capacity of the battery increases, and service life thereof increases.

TEST EXAMPLES

Preparation of All-Solid-State Lithium Ion Battery
(1) Preparation Example 1
A slurry was prepared by completely dissolving the HNBR of Example 5 in a mixed solvent, and then mixing sulfur (an active material), Ketjchenblack (a conductive material), a sulfide-based solid electrolyte, and a dispersing agent.

A cathode was prepared by applying the slurry on a current collector. A content ratio of each constituent element is shown in the following [Table 5].

TABLE 5

| Constituent element | Content [wt %] |
|---|---|
| Sulfur | 12 |
| Ketjenblack | 2.8 |
| Solid electrolyte | 23.2 |
| HNBR | 1.2 |

TABLE 5-continued

| Constituent element | Content [wt %] |
| --- | --- |
| Dispersing agent | 0.8 |
| Mixed solvent | 60 |

An all-solid-state lithium ion battery was produced by forming a solid electrolyte layer on an upper side of the cathode, and forming an anode on an upper side of the solid electrolyte layer.

(2) Preparation Example 2

An all-solid-state lithium ion battery was produced in the same manner as in Preparation Example 1, except that NBR in the Comparative Example was used instead of the HNBR.

(3) Preparation Example 3

A slurry was prepared by completely dissolving the HNBR of Example 5 in a mixed solvent, and then mixing an NCM (an active material), Super C (a conductive material), and a sulfide-based solid electrolyte.

A cathode was prepared by applying the slurry on a current collector. A content ratio of each constituent element is shown in the following [Table 6].

TABLE 6

| Constituent element | Content [wt %] |
| --- | --- |
| NCM | 42 |
| Super C | 2 |
| Solid electrolyte | 15 |
| HNBR | 1 |
| Mixed solvent | 40 |

An all-solid-state lithium ion battery was produced by forming a solid electrolyte layer on an upper side of the cathode, and forming an anode on an upper side of the solid electrolyte layer.

(4) Preparation Example 4

An all-solid-state lithium ion battery was produced in the same manner as in Preparation Example 3, except that the NBR in Comparative Example was used instead of the HNBR.

(5) Measurement of Discharge Capacity

Figure 5:
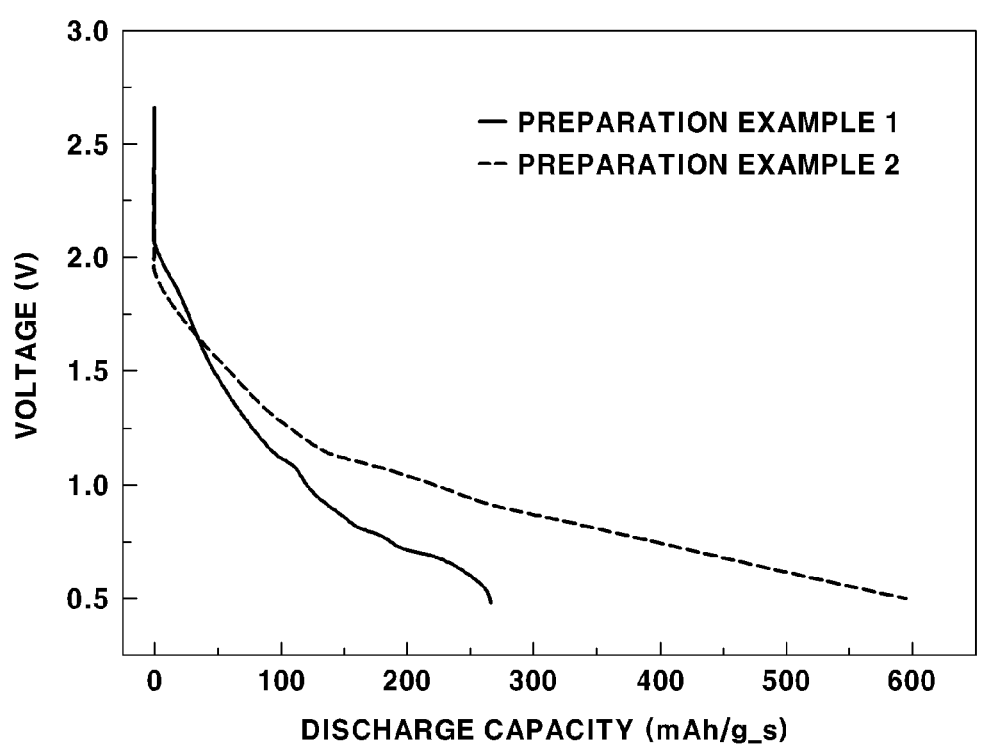
FIG. 5 is a graph showing discharge capacities of all-solid-state lithium ion batteries of Preparation Examples 1 and 2.

FIG. 5 is a graph showing discharge capacities of the all-solid-state lithium ion batteries prepared in Preparation Examples 1 and 2. It can be seen that the discharge capacity of Preparation Example 1 in which the HNBR was used was measured at a higher level.

Figure 6:
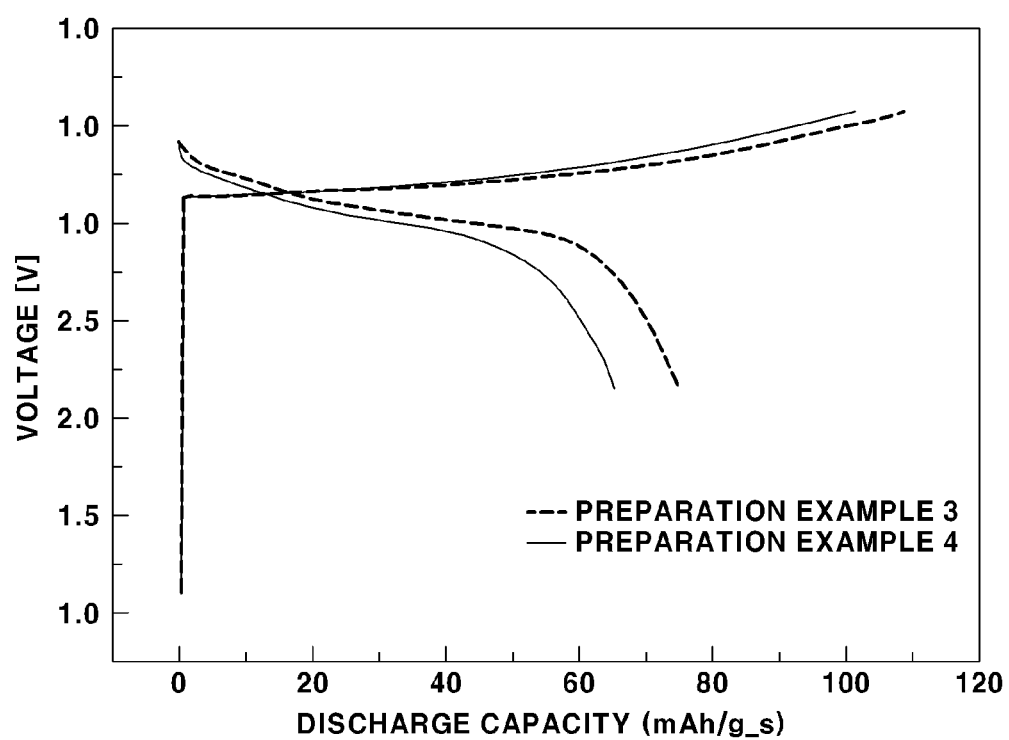
FIG. 6 is a graph showing discharge capacities of all-solid-state lithium ion batteries of Preparation Examples 3 and 4.

FIG. 6 is a graph showing discharge capacities of the all-solid-state lithium ion batteries prepared in Preparation Examples 3 and 4. It can be seen that the discharge capacity of Preparation Example 3 in which the HNBR was used was measured at a higher level.

The binder according to the present disclosure is an HNBR having an amount of residual double bond of more than 0% and 5.5% or less, and thus, has low reactivity against a sulfide-based compound. Accordingly, the degree of binder curing may be lowered during charge and discharge of the battery.

The binder according to the present disclosure is an NBR having a nitrile content of 20% to 30%, and thus, is completely dissolved in a mixed solvent obtained by mixing a CPME and a ketone-based solvent. Accordingly, the binder may be uniformly dispersed in the cathode.

As a result, since the binder may effectively alleviate an interface resistance between cathode materials, a capacity of the battery increases, and service life thereof increases.

As described above, the present disclosure has been described in detail. However, the right scope of the present disclosure is not limited thereto, and is determined by the following claims.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A cathode of an all-solid-state lithium ion battery prepared by applying a slurry, in which an active material, a conductive material, a sulfide-based solid electrolyte, and a binder are mixed, to a substrate,
    wherein the binder is a hydrogenated nitrile butadiene rubber (HNBR) having a residual double bond, an amount thereof is more than 0% and equal to or less than 5.5% based on a total amount of the HNBR.

2. The cathode of claim 1, wherein the amount of the residual double bond is more than 0% and equal to or less than 0.9%.

3. The cathode of claim 1, wherein the slurry further comprises a solvent which dissolves the binder, and the solvent includes a mixture of cyclopentyl methyl ether (CPME) and a ketone-based solvent.

4. The cathode of claim 3, wherein the ketone-based solvent is acetone or methyl ethyl ketone (MEK).

5. The cathode of claim 3, wherein the CPME and the ketone-based solvent are mixed at a weight ratio of 9:1 to 8:2.

6. The cathode of claim 3, wherein the HNBR has a nitrile content of 20 mol % to 30 mol % based on the total amount of the HNBR.

7. The cathode of claim 6, wherein an amount of the residual double bond is 5.5% and the nitrile content is 20%.

8. The cathode of claim 6, wherein the amount of the residual double bond is 0.9% and the nitrile content is 20%.

9. The cathode of claim 1, wherein the slurry further comprises a solvent which dissolves the binder, and the solvent includes a mixture of xylene and a ketone-based solvent.

10. The cathode of claim 1, wherein the slurry further comprises a solvent which dissolves the binder, and the solvent includes a mixture of heptane and a ketone-based solvent.

11. An all-solid-state lithium ion battery comprising a cathode, wherein the cathode is prepared by applying a slurry, in which an active material, a conductive material, a sulfide-based solid electrolyte, and a binder are mixed, to a substrate, and
    wherein the binder is a hydrogenated nitrile butadiene rubber (HNBR) having a residual double bond, an amount thereof is more than 0% and equal to or less than 5.5% based on a total amount of the HNBR.

* * * * *